June 21, 1927.  1,632,895
T. HAGELTHORN
CLEANER
Filed March 6, 1923   2 Sheets-Sheet 1
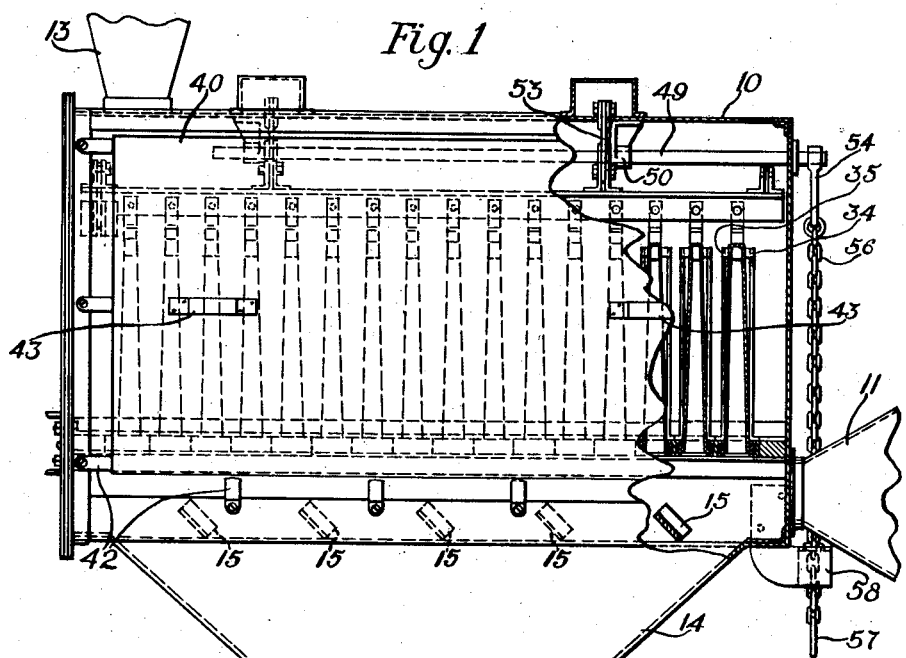
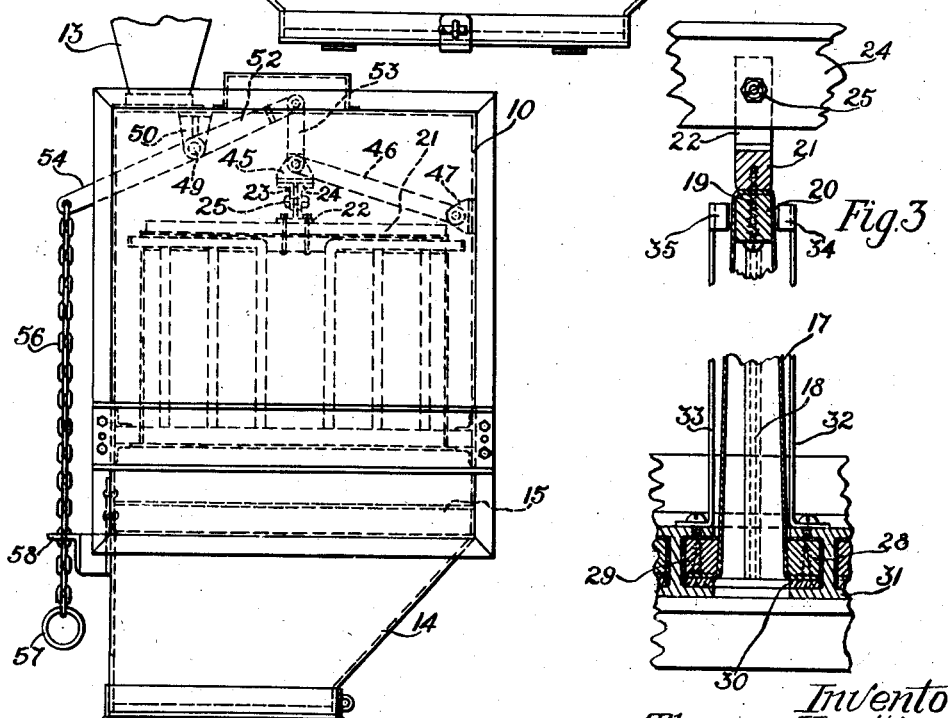
Inventor
Thomas Hagelthorn
by H.O.Pattison
Atty.

June 21, 1927. 1,632,895
T. HAGELTHORN
CLEANER
Filed March 6, 1923 2 Sheets-Sheet 2

Inventor
Thomas Hagelthorn
by H.A.Patterson
Atty.

Patented June 21, 1927.

1,632,895

UNITED STATES PATENT OFFICE.

THOMAS HAGELTHORN, OF CHICAGO, ILLINOIS, ASSIGNOR TO WESTERN ELECTRIC COMPANY, INCORPORATED, OF NEW YORK, N. Y., A CORPORATION OF NEW YORK.

CLEANER.

Application filed March 6, 1923. Serial No. 623,151.

This invention relates to cleaners and more particularly to devices wherein air or some other medium is passed through a screen to remove therefrom particles of dust or other foreign matter carried by the medium.

In apparatus of this nature some of the particles of foreign matter are retained by the screen and must be periodically removed therefrom in order to prevent the clogging of the interstices of the screen.

In order to conveniently clean a large volume of a medium heavily laden with foreign matter, it is the usual practice to provide a plurality of screens through which portions of the medium are passed simultaneously. Since these screens may not wear uniformly it is sometimes necessary to individually repair or replace certain of the screen units.

It is also desirable to so direct the medium that it will be distributed among the various screens to insure the uniform utilization of such screens and to deflect the medium from the foreign matter which has been previously removed from the screens and deposited in a receptacle.

It is an object of this invention to simplify and improve the construction of a multiple screen cleaner.

Another object is to positively remove from the screens particles of foreign matter retained thereby.

Further objects are to equalize the distribution of the medium among the several units of a multiple screen cleaner, and to prevent the medium from disturbing the foreign matter previously removed and deposited in a receiving chamber.

In order to obtain these objects, in accordance with features of the invention, a portion of the enclosing cover of a multiple screen cleaner is made removable to permit access to any of the individual units which are mounted on individual tracks or ways so that they may be removed individually. Vanes are provided to direct the dust laden air or other medium away from the deposited foreign matter and to distribute the medium among the various cleaning units. Mechanism is also provided for periodically shaking or beating the screen units to dislodge the particles of foreign matter retained thereby. These and other features will be fully comprehended from the following description and the accompanying drawings showing two forms of apparatus embodying the invention.

In the accompanying drawings,

Fig. 1 shows a fragmentary side elevation partially in section of a multiple unit cleaning apparatus embodying the invention.

Fig. 2 shows a fragmentary end elevation of the apparatus shown in Fig. 1;

Fig. 3 is an enlarged sectional view of one of the cleaning units;

Figure 4:
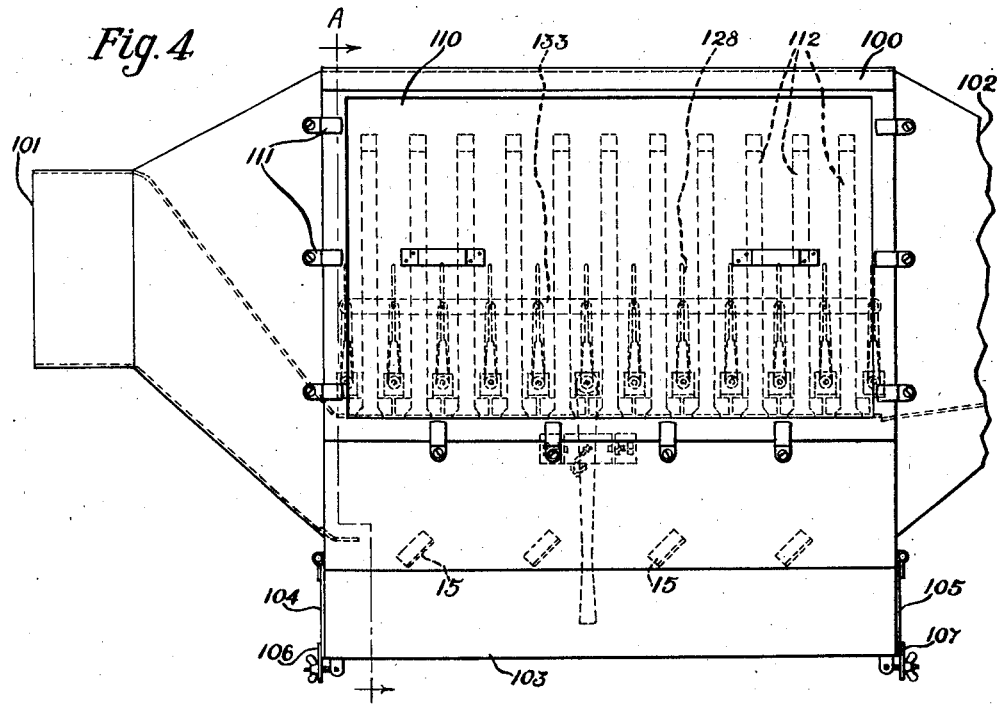
Fig. 4 shows a fragmentary side elevation of another form of multiple unit cleaner embodying the invention.

Referring to the drawings, in which like reference numerals are used to designate similar parts in the various figures, in the type of apparatus shown in Figs. 1, 2 and 3, a sheet metal casing 10 provides a substantially air tight chamber in which the cleaning units are installed. Attached to the right hand end of the enclosing walls is an inlet 11 through which the air or other medium to be cleaned is admitted to the chamber, while the outlet 13, attached to the top of the enclosing chamber, provides an egress for the medium. A receiving chamber 14 is attached to the bottom of the cleaning chamber in which the dust or other foreign matter removed from the medium is deposited. A plurality of vanes 15, attached to the sides of the enclosing chamber and extending across the bottom of the chamber serve to deflect the air or other medium away from the hopper 14 leading to the previously removed material, and also serve to evenly distribute the medium upwardly through the various units of the apparatus. Each of the cleaning units consists of an open bag or compartment 17 composed of canvas or other suitable screening material, the edges of the sheet used in the manufacture thereof being sewed together by means of a seam 18 so that the bag is completely closed except for the mouth thereof. The upper portion of the bag or compartment is attached by means of wood screws 19 extending through a member 20 and into a member 21. The member 21 is attached at its midpoint to a T shaped member 22 by means of suitable bolts and nuts. The member 22 extends between a pair of angles 23 and 24 running lengthwise of the cleaner and common to the various units thereof and is clamped between such angles by means of bolts 25. At the open end of the bags or compartments, the canvas or other screening material is bent over the edges of suitable wooden members 28 and 29 and attached thereto by wood screws or some other suitable means, co-operating with cleats 30. I shaped members 31 are employed to provide individual tracks or ways for the movement of the open ends of the bags or compartments so that they can be easily removed from the side of the device. A lining of suitable packing material is provided between the members 28 and 29 and the members 31 to seal these openings against the passage therethrough of the medium.

Extending upwardly from the members 31 is a pair of frameworks 32 and 33 suitably attached to the members 31 and having horizontally disposed members 34 and 35 which serve to keep the canvas or other screening material 17 of the associated bag or compartment from expanding sufficiently, due to the pressure of the air or other medium passing therethrough, to interfere with the operation of the adjacent screen units.

A portion 40 of one side of the enclosing wall is made removable and is retained in place, when the device is in operation, by means of a plurality of clamps 42 disposed around the edges of the portion 40 and attached to the exterior of the enclosure 10. In order to assist in the easy removal of the portion 40, suitable handles 43 are attached thereto. By the removal of the portion 40 access may be had to all of the cleaning units, and by the removal of any member 22 from the common longitudinal angles 23 and 24 an individual unit may be easily removed from the side of the chamber and replaced or repaired as the circumstances indicate.

The longitudinal angles 23 and 24 are attached at a plurality of points to a pair of pivot members 45 attached to one end of arms 46, the other ends of which are pivotally attached to suitable brackets 47 secured to the interior wall of the enclosing chamber 10. A common rod 49 extending longitudinally through the chamber 10 is rotatably mounted in suitable bearings in the walls and at a plurality of other points therein by brackets 50. Attached to and movable with the rod 49 are several arms 52, the other extremity of which in each case is pivotally attached to a vertical link 53 which in turn is pivoted to the bracket 45 jointly with the arm 46. An arm 54 attached to the end of the rod 49 as it projects beyond the end of the enclosing chamber 10 provides means for rotating the rod 49. A chain 56 or some other suitable means is attached to the end of the bracket 54 and terminates in a ring 57 to provide means for the operator to readily grasp it. In the normal position of the apparatus the chain is secured in a slot in an angle bracket 58 attached to the side of the enclosing chamber as shown.

In the operation of the device the air or other medium to be cleaned is passed through the inlet 11 into the enclosing chamber 10 below the screens, the vanes 15 serving to distribute it amongst the bags or compartments 17 so that it flows through the screens of all of the compartments contemporaneously and flows out of the chamber through the discharge 13. As the medium flows through the screens the foreign matter carried thereby is retained on the screens. At stated intervals, determined by the character of the medium to be cleaned, the operator removes the chain 56 from its normal position retained by the bracket 58 and allows the exterior end of the arm 54 to move upward, thus rotating the rod 49. As the rod 49 rotates in the direction occasioned by the release of the chain 56, the link 53 forces the bracket 45 downwardly, the arms 46 moving about their pivot points in the brackets 47. The bracket 45 in moving downwardly causes the common angles 23 and 24 and the individual T shaped members 22 attached thereto to also move downwardly, thus simultaneously collapsing the walls of all of the cleaning units or bags 17. Immediately thereafter the operator restores the arm 54 to its normal position and locks the chain 56 in the bracket 58, thus restoring to their normal positions the walls of the units. These operations are performed in a quick manner and are repeated until substantially all of the foreign matter retained is removed from the screen units and falls by gravity into the receiving chamber 14, from which it may be removed as occasion demands.

Figure 5:
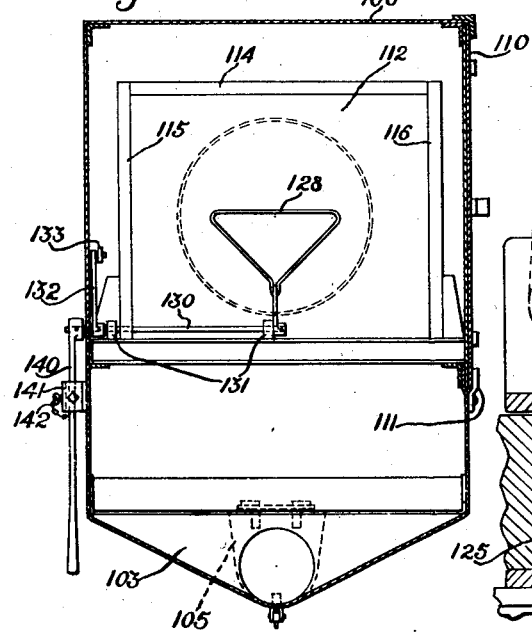
Fig. 5 is a sectional view of the apparatus shown in Fig. 4 taken along the line AA looking in the direction of the arrow.
Figure 6:
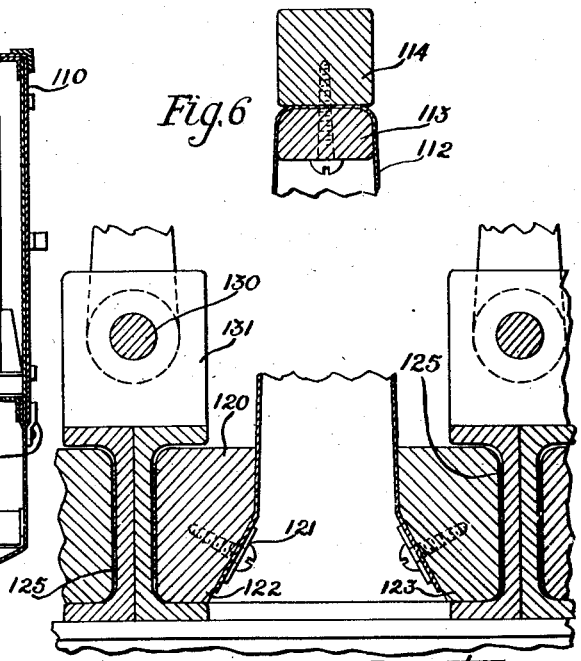
Fig. 6 shows an enlarged cross section of one of the units of the apparatus shown in Figs. 4 and 5.

In the arrangement shown in Figs. 4, 5 and 6 an enclosing chamber 100 is provided for the units of the cleaner and an opening 101 is provided in the left hand side thereof for admitting to the interior of the chamber the medium to be cleaned, while a discharge 102 is provided at the right hand end of the enclosing chamber for the discharge of the cleaned medium.

As in the previous case, a plurality of vanes 15 serve to distribute the medium amongst the different cleaning units of the apparatus and to deflect it from the foreign matter which has been previously removed and deposited in a receiving chamber 103. Access to the receiving chamber is provided by means of doors 104 and 105 at the ends, which may be secured in place by means of suitable clamps 106 and 107 controlled by wing nuts. Also as in the previous case, a portion 110 of the enclosing chamber side wall is made removable to permit easy access to the various units of the system, this portion being held in place by a plurality of clamps 111 suitably attached to the side wall. In this case the individual bags or screens are composed of canvas or other suitable screening material and the closed end of each bag 112 is attached by means of a wood strip 113 having a plurality of wood screws passing therethrough and into a wooden member 114 forming the upper horizontal of an individual wooden framework for the unit. The horizontal member 114 is suitably supported by means of standards 115 and 116 which are supported from the bottom framework for the bag and serve to hold the bag in the normal position as shown. At the lower or open end of the bag the canvas is attached to a beveled rim member 120 by means of a plurality of wood screws and washers 121. The rim member 120 slidably engages channel irons 122 and 123 which cooperate to form a track or way for the ready removal of the bag and its associated framework. Suitable packing or other material 125 may be employed between the arm of the bag and the associated channel iron to effectually prevent the flow of the medium therethrough.

A plurality of beaters 128, suitably formed of wire or other material, are placed so that both sides of each bag may be beaten. Each of the beaters 128 is attached to a rod 130 mounted in a bearing 131. Attached to the rod 130 is a vertical link 132, the upper end of which is pivotally attached to a common longitudinal bar or member 133 so that when the bar 133 moves, each of the rods 130 is rotated, caused by the movement of the link 132. One of the rods 130, preferably one near the center of the apparatus, extends through the wall of the enclosing chamber 100 and attached thereto on the outside of the chamber is a lever 140 which may operate to and fro within a U shaped keeper or bracket 141 suitably attached to the wall of the enclosing chamber 100. In its normal position the lever 140 is in a vertical position and is retained therein by a pin 142 secured to the member 141 by means of a chain or in any similar other manner, the end of the pin passing through a hole in the keeper 141 and engaging an opening in the lever 140.

In the operation of the apparatus shown in Figs. 4, 5 and 6, the air or other medium to be cleaned enters the chamber through the inlet 101 and is deflected from the receiving chamber 103 by the vanes 15 which also serve to distribute the medium among the various units of the device. The medium then passes through the screen walls of the units and passes out of the chamber through the discharge 102, leaving substantially all of the foreign matter carried thereby on the screen walls. Periodically, as determined by the character of the medium being cleaned, the operator removes the pin 142 from its position shown and moves the lever 140 with a quick motion toward one end of the chamber, thus causing the particular rod 130 to which it is attached to rotate and its corresponding beater 128 to travel toward and against the screen wall of one of the compartments. By virtue of the associated link 132, the common member 133 is caused to move longitudinally, and through the other corresponding links 132 the other rods 130 are caused to similarly rotate to actuate their associated beaters 128 in a similar manner. The operator then moves the lever 140 toward the other end of the chamber with a quick motion and in a similar manner causes all of the beaters 128 to forcibly strike the other sides of the compartments. This operation may be continued if desired until all of the dust or other foreign matter retained by the screen walls has been removed therefrom, after which the lever is restored to its normal position as shown. This beating of both sides of the bags serves to effectually dislodge the foreign matter which then falls by virtue of gravity into the receiving chamber 103, from which it may be removed at intervals as desired by opening the doors 104 and 105.

What is claimed is:

1. A cleaner comprising an enclosure, a plurality of screens dividing said enclosure into two compartments, one above and the other below the screens, an exhaust duct connected with said upper compartment, said lower compartment terminating in a storage receptacle, an intake passage connected with said lower compartment, and a plurality of upwardly inclined spaced baffles arranged between the screens and the storage receptacle and in line with said intake passage whereby the incoming medium is distributed at a plurality of points to said screens and is directed away from said storage receptacle.

2. A cleaner comprising an enclosure, a plurality of collapsible screens dividing said enclosure into two compartments, one above and the other below the screens, an exhaust duct connected with said upper compartment, said lower compartment terminating in a storage receptacle, an intake passage connected with said lower compartment, a plurality of upwardly inclined spaced baffles arranged between the screens and the storage receptacle and in line with said intake passage whereby the incoming medium is distributed at a plurality of points to said screens and is directed away from said storage receptacle, and means for collapsing said screens and restoring them to their original shape for dislodging the material retained thereby.

In witness whereof, I hereunto subscribe my name this 23rd day of February A. D., 1923.

THOMAS HAGELTHORN.